July 9, 1929.  C. R. GOTTSCHALL ET AL  1,720,176
BIN DELIVERY CONTROL
Filed Oct. 3, 1927

INVENTORS
Clarence R. Gottschall
Harry H. Pike
BY
ATTORNEY

Patented July 9, 1929.

1,720,176

UNITED STATES PATENT OFFICE.

CLARENCE R. GOTTSCHALL AND HARRY H. PIKE, OF INDEPENDENCE, MISSOURI, ASSIGNORS TO THE GLEANER COMBINE HARVESTER CORPORATION, OF KANSAS CITY, MISSOURI, A CORPORATION OF DELAWARE.

BIN DELIVERY CONTROL.

Application filed October 3, 1927. Serial No. 223,634.

Our invention relates to bins and more particularly to discharge outlet of grain bins, the principal objects of the invention being to accurately control the gravity delivery of grain from a bin, to provide for quick response of the control means to manual actuation, and to provide for efficient and reliable actuation by an operator located remotely from the discharge outlet.

In accomplishing these and other objects of the invention we have provided improved details of structure, the preferred forms of which are illustrated in the accompanying drawings, wherein.

Figure 1:
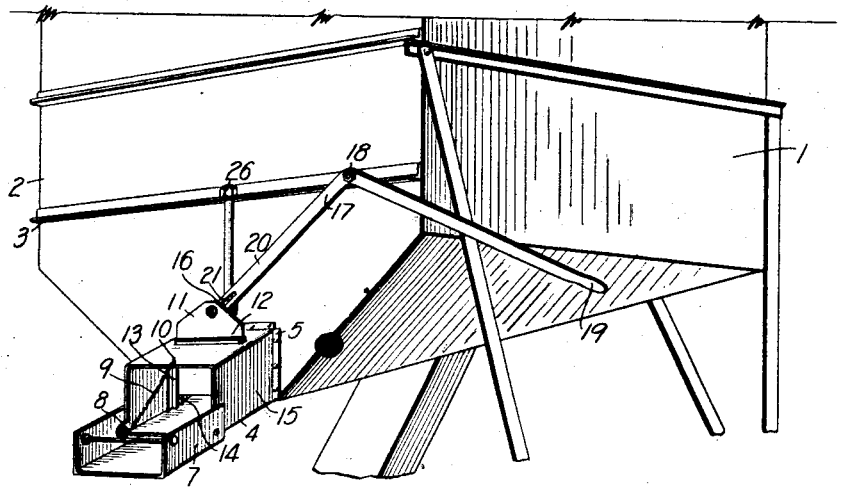
Fig. 1 is a perspective view of a bin or hopper, and a discharge control element embodying our invention connected therewith.
Figure 2:
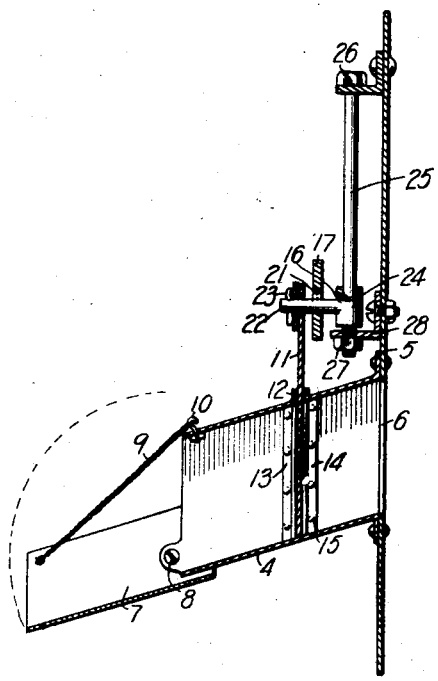
Fig. 2 is a longitudinal, vertical section through the control element and bin wall to which it is attached.
Figure 3:
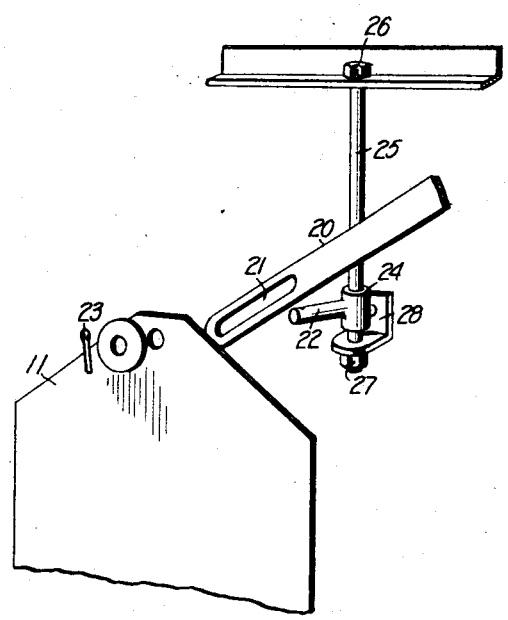
Fig. 3 is an enlarged perspective fragmentary view of a discharge gate and actuating lever, and supporting elements.

Referring in detail to the drawings:

1 designates a bin or hopper such as is used with threshing machines to receive threshed grain, and in which a quantity of grain may be assembled for delivery to a wagon, car, or other receptacle. The bin is composed preferably of metal plates, such as the wall 2, reenforced by angle braces such as 3. Delivery or discharge of grain from the bin is controlled in accordance with the presence and position of a receiver, and means for conducting the grain from the bin into the receiver are preferably provided in ordinary practice. We provide improved features for these purposes, namely, a preferably rectangular metal discharge or channel member conduit 4 in communication with the bin extending downwardly at an angle from the bin and having a peripheral flange 5 riveted to the bin wall peripherally of the communicating opening 6, and a spout 7 pivotally mounted on the conduit at 8 for swinging into discharging or out-of-the-way position, and supported in discharging position by a chain 9 secured to the conduit by a hook 10.

We provide, for control of the discharge of grain from the the bin through the outlet conduit, means including a relatively thin gate plate 11, vertically slidable in a slot 12 in the top wall of the conduit and guided by spaced angle plates such as 13 and 14, secured by rivets 15 to the inside surfaces of opposite side walls of the conduit, and a gate-actuating assembly generally designated 16 including a lever 17 pivoted in the wall of the bin in an offset position from the conduit, the pivot pin 18 thereof being preferably installed through the angle brace 3. The lever comprises a handle portion 19 and a bearing portion 20 extending in an angular direction from the handle portion provided with a slot 21 for engagement with a bar 22 that is fixed in the upper portion of the gate by a cotter pin 23, whereby the lever may elevate and lower the gate. The bar 22 and the gate are limited to vertical movement by the mounting of a sleeve member 24 integral with the bar on a rod 25 positioned vertically adjacent the wall of the bin and spaced therefrom, the upper end of the rod being engaged with the angle brace 3 of the bin by a bolt head 26 and the lower end being engaged by a nut 27 with a special bracket 28 riveted to the wall of the bin. The rod is positioned on the longitudinal bisector of the conduit so that it extends in registry with the vertical axis of the gate. The sleeve member is slidable on the rod and the slotted lever arm is slidable on the pin.

The elements being provided and assembled as described, the spout positioned to receive grain from the conduit and conduct it outwardly to a receiver, the handle of the lever, extending downwardly from the elevated bin or hopper accessible for an operator positioned relatively remotely from the bin, may be depressed, to elevate the gate to permit outflow of grain contained in the bin through the conduit and spout. The pivotal connection of the slotted end of the lever with the gate permits the lever end to slide over the gate-supporting bar while the bar is restrained in its vertical movement by the sleeve member slidable on the vertical rod fixed to the bin, whereby the gate is limited to vertical movement in its angle plate grooves. Frictional resistance of the gate bearings is thus minimized and the factor of friction is confined to the relatively small area of the bearing of the slotted lever end on the gate-lifting bar, and the bearing of the sleeve member on the vertical rod. The operation of the actuating lever is, therefore, facilitated, and exact control of the gate is provided for moving the gate to a desired position for regulating the volume of grain passing through the conduit. The facility of control also enables the operator to close the gate quickly and completely, and with a minimum of effort, by reason of positive connection of the lever with the gate.

What we claim and desire to secure by Letters Patent is:—

1. In combination with a grain bin and its delivery chute, a gate for the chute, a fixed guide member, an actuating bar movable on the guide member and connected with the gate, and a slotted lever engaging the actuating bar for actuating the gate.

2. In combination with a grain bin and its delivery chute, a gate slidable vertically in the chute, an actuating lever having a slotted arm projected along the gate, a fixed vertical guide rod, and a bar slidably mounted on the guide rod extending through the lever arm slot and connected with said gate.

3. In combination with a grain bin and a delivery chute for the bin, having a vertical guideway, a gate slidable in said guideway having an aperture in its upper end, a vertical rod connected to the bin, a lever pivoted on the bin having a slotted arm interposed between the gate and rod, a collar slidable on the rod, and a bar on said collar extended through the lever arm slot and gate aperture for effecting movement of the gate in a fixed vertical plane responsive to reciprocation of the lever.

In testimony whereof we affix our signatures.

HARRY H. PIKE.
CLARENCE R. GOTTSCHALL.